(12) United States Patent
Aoki et al.

(10) Patent No.: US 7,693,989 B2
(45) Date of Patent: Apr. 6, 2010

(54) COMMUNICATION DEVICE PREVENTING UNAUTHORIZED ACCESS TO ITS SERVICES VIA USER INTERVENTION AND A METHOD THEREOF

(75) Inventors: Kazuma Aoki, Kasugai (JP); Yuji Sato, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1150 days.

(21) Appl. No.: 10/671,686

(22) Filed: Sep. 29, 2003

(65) Prior Publication Data

US 2004/0073689 A1 Apr. 15, 2004

(30) Foreign Application Priority Data

Sep. 30, 2002 (JP) ............................. 2002-285189

(51) Int. Cl.
G06F 15/16 (2006.01)
G06K 15/00 (2006.01)

(52) U.S. Cl. ........................ 709/225; 358/1.15; 715/743

(58) Field of Classification Search ................... 710/37; 715/742, 743; 709/225; 358/1.15
See application file for complete search history.

(56) References Cited

U.S. PATENT DOCUMENTS

| | | | | |
|---|---|---|---|---|
| 6,101,616 | A * | 8/2000 | Joubert et al. ................. | 714/11 |
| 6,189,032 | B1 * | 2/2001 | Susaki et al. ................. | 709/225 |
| 7,095,716 | B1 * | 8/2006 | Ke et al. ..................... | 370/230 |
| 2001/0048744 | A1 | 12/2001 | Kimura | |
| 2001/0051534 | A1 * | 12/2001 | Amin ......................... | 379/200 |
| 2002/0042884 | A1 | 4/2002 | Wu et al. | |
| 2002/0091532 | A1 * | 7/2002 | Viets et al. .................. | 705/1 |
| 2002/0110123 | A1 | 8/2002 | Shitama | |
| 2002/0126822 | A1 * | 9/2002 | Boehmke et al. ........ | 379/221.03 |
| 2003/0041333 | A1 * | 2/2003 | Allen et al. ................. | 725/106 |

FOREIGN PATENT DOCUMENTS

| | | |
|---|---|---|
| EP | 1 161 031 A2 | 12/2001 |
| EP | 1 161 031 A3 | 6/2003 |
| JP | A-64-4157 | 1/1989 |
| JP | A-3-101455 | 4/1991 |
| JP | A 8-30692 | 2/1996 |
| JP | A-2001-28639 | 1/2001 |
| JP | A-2001-309040 | 11/2001 |
| JP | A-2001-345819 | 12/2001 |
| JP | A 2002-91739 | 3/2002 |
| JP | A-2002-152279 | 5/2002 |

* cited by examiner

Primary Examiner—Jungwon Chang
(74) Attorney, Agent, or Firm—Oliff & Berridge, PLC

(57) ABSTRACT

A communication device is connected with a wide area network (WAN) and a local area network (LAN) and includes a recording unit that performs predetermined processing in accordance with a request, that comes in through the WAN or the LAN. A controller of a communication module of the communication device determines whether a request came in through the WAN or the LAN. When the request comes in through the WAN, the controller demands an acceptance/rejection determination as to the performance of the request from a user of the communication device. When the performance of the requested operation is accepted, the controller performs the processing according to the request that came in through the WAN.

20 Claims, 8 Drawing Sheets

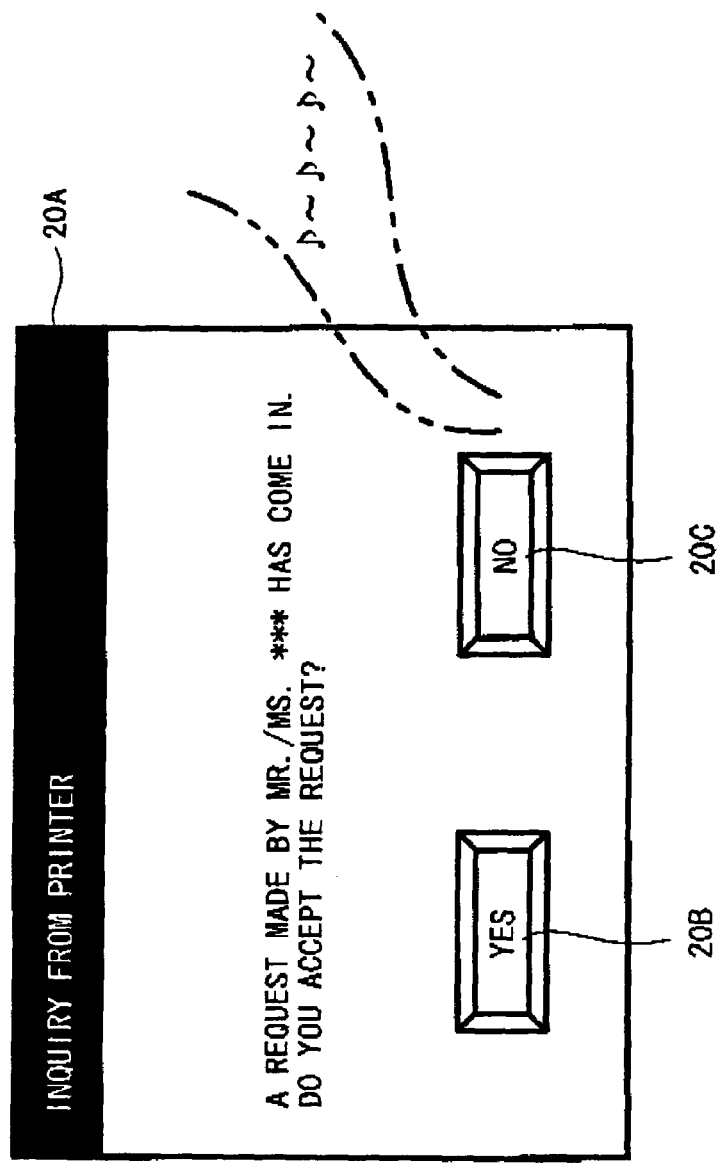

COMMUNICATION DEVICE PREVENTING UNAUTHORIZED ACCESS TO ITS SERVICES VIA USER INTERVENTION AND A METHOD THEREOF

BACKGROUND OF THE INVENTION

1. Field of Invention

The invention relates to a communication device that is connected to a LAN (local area network) and/or a WAN (wide area network) and can perform a printing operation in accordance with a print request made by LAN terminals and/or WAN terminals through the LAN and/or WAN.

2. Description of Related Art

Japanese Laid-Open Patent Publication No. 2002-91739 (page 4 and FIG. 1) and Japanese Laid-Open Patent Publication No. 08-30692 (page 5 and FIG. 1) disclose a printing system in which a printer is connected to a LAN and/or a WAN. U.S. patent application Publication No. US 2002/0042884 (page 4 and FIG. 1) discloses a printing system in which an authenticated document is printed at a distant location by remote control.

A system has been suggested in which a printer is connected with a WAN, such as the Internet, as well as personal computers installed in a building or a house, via a LAN. In this system, the printer can be used by specific computers by performing authentication using, for example, passwords. However, this authentication confirms the identity of not only users on the WAN but also users on the LAN, so that this system has less usability. Also, a password may be artificially leaked to outsiders as well as being leaked by stealing packets from a network (sniffing). Accordingly, there is a possibility that unauthorized users can use the printer by using stolen passwords.

SUMMARY OF THE INVENTION

The invention thus provides a communication device that prevents unauthorized access by outsiders while improving its usability. According to one exemplary aspect of the invention, a communication device, which is connected to a wide area network (WAN) and a local area network (LAN), includes a controller that determines whether a request to perform predetermined processing came in from the WAN or the LAN, allows a user of the communication device to determine whether an operation according to the request is accepted or rejected when it is determined that the request came in from the WAN, and allows the predetermined processing to be performed according to the request when a performance of the operation according to the request is accepted.

According to the communication device, the user of the communication device determines whether the performance of an operation according to the request is accepted or rejected every time the request for the performance of the processing is made to the communication device through the WAN. Thus, unauthorized access by outsiders can be prevented. When a request is made to the communication device through the LAN, processing according to the request is performed without requesting the user of the communication device to perform the determination, thereby improving the usability of the communication device.

BRIEF DESCRIPTION OF THE DRAWINGS

Embodiments of the invention will be described in detail with reference to the following figures wherein:

FIG. 8 is an explanatory diagram showing an operating condition of the PC during the acceptance/rejection determining processing.

DETAILED DESCRIPTION OF PREFERRED EMBODIMENTS

Figure 1:
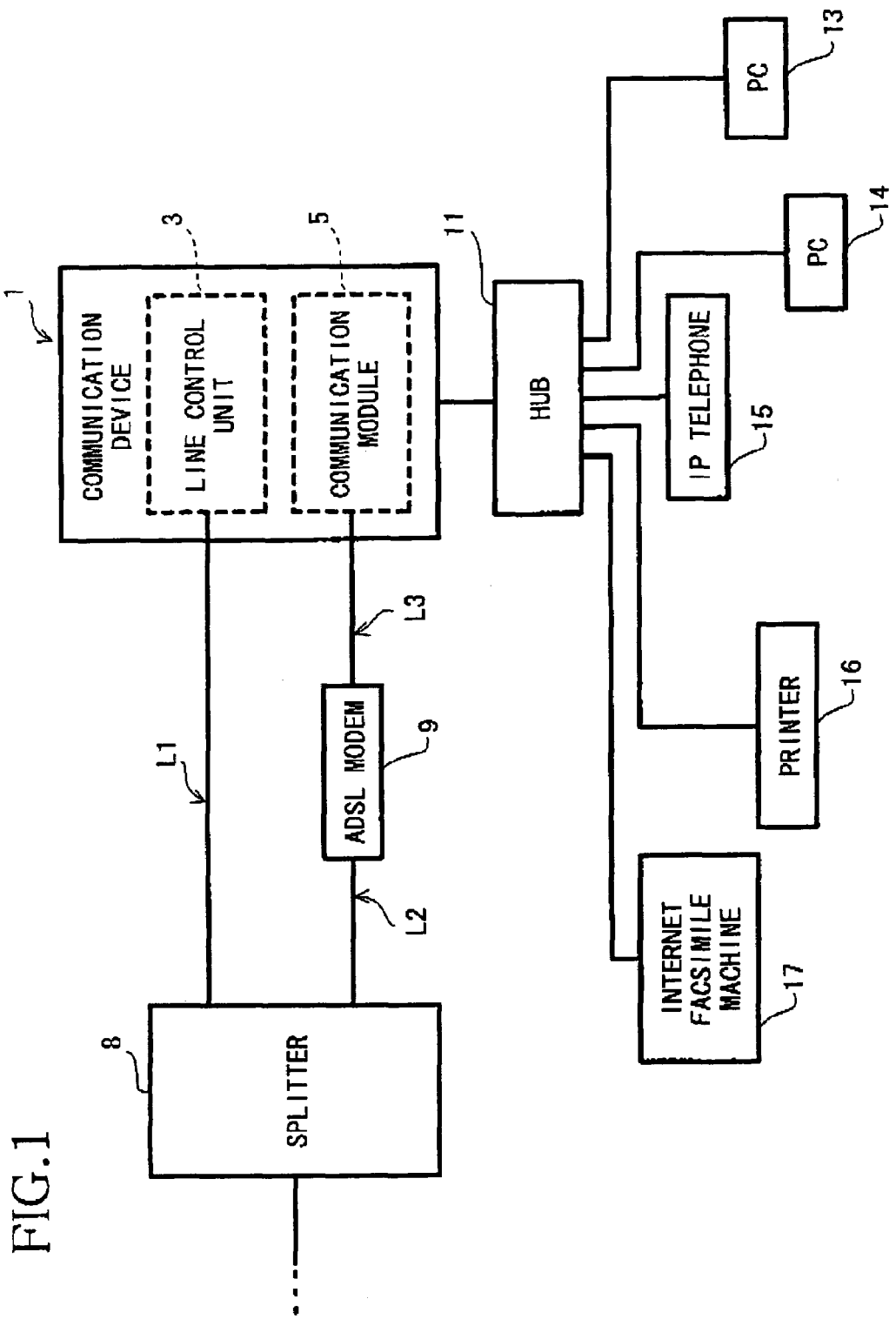
FIG. 1 shows a usage pattern of a communication device to which the invention is applied.
Figure 2:
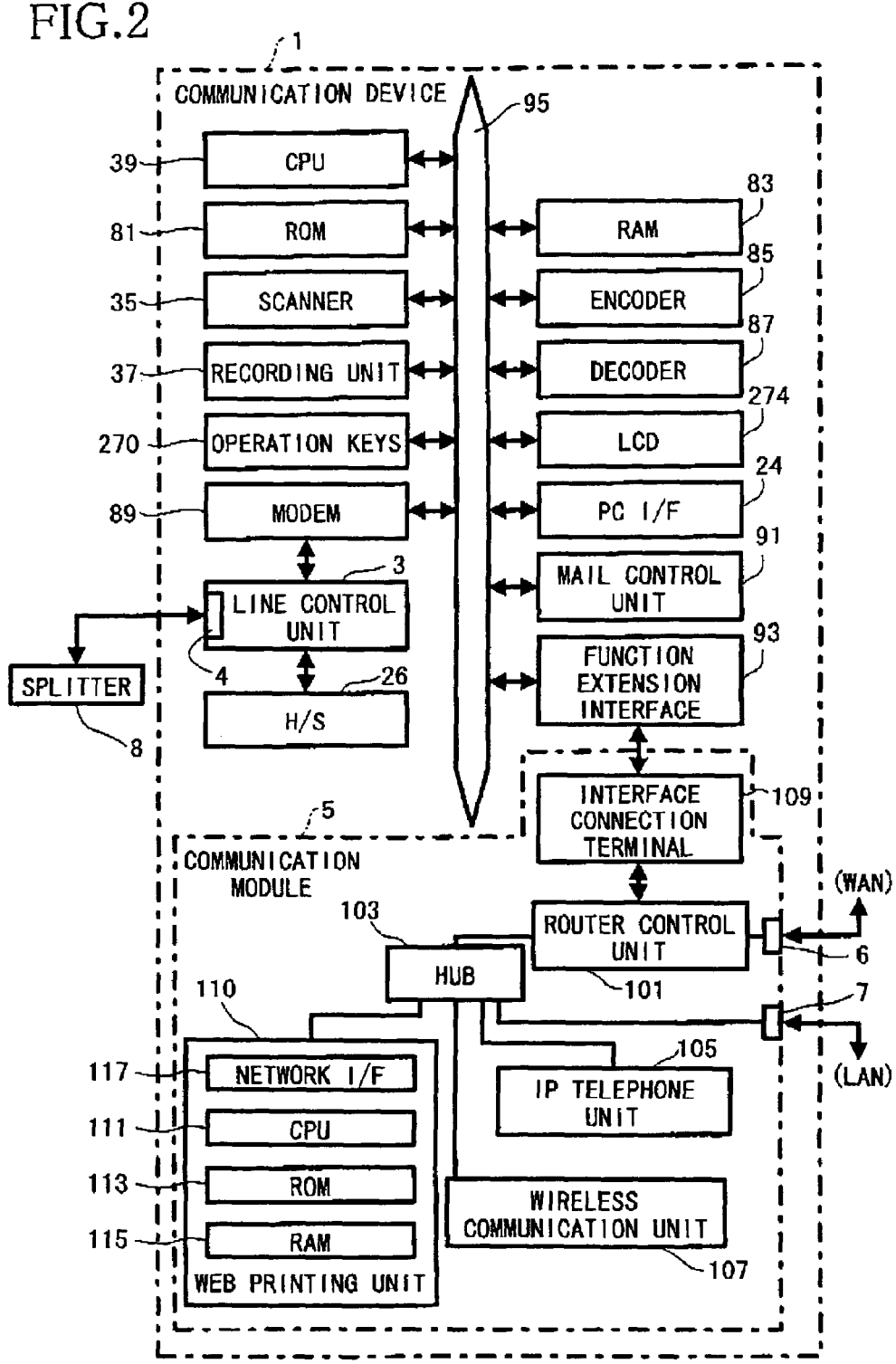
FIG. 2 is a block diagram showing an electronic configuration of the communication device of the embodiment.

Embodiments of the invention will be described with reference to the accompanying drawings. As shown in FIG. 1, a communication device 1 includes a line control unit 3 and a communication module 5. The line control unit 3 includes an external port 4 (FIG. 2), which is connected with an analog line L1 (a telephone line made of 2-wire cord or 4-wire cord) that is connected to a telephone port of a splitter 8 installed inside buildings, such as houses and offices. The communication module 5 includes a WAN port 6 and a LAN port 7 (FIG. 2). The WAN port 6 is connected to a wide-area network (WAN), such as the Internet, via a LAN cable L3, an ADSL modem 9, a LAN cable L2, and the splitter 8, in this order.

The LAN port 7 is connected with a hub 11. The hub 11 is connected to various LAN terminals, for example, bidirectionally communicable PCs (personal computers) 13, 14, a network printer (such as an ink-jet printer or a laser-beam printer) 16, an IP telephone 15 that can send and receive voice signals in an IP (Internet Protocol) system, and an Internet facsimile machine 17. That is, the hub 11 is connected with a local-area network (LAN) constructed by the LAN terminals 13 to 17 installed in a building.

The splitter 8 is a well-known splitter used for an ADSL (asymmetric digital subscriber line). The splitter 8 separates a superimposed transmission signal into a first signal and a second signal to output the first signal and the second signal to the telephone port and the ADSL modem port, respectively. The first signal is a signal of a maximum of about 4 kHz, which is transmitted from a splitter (not shown) installed in a base station. The second signal is a signal for ADSL, having a higher frequency than the first signal. The splitter 8 also superimposes one signal on another, which are inputted from the telephone port and the ADSL modem port, and transmits the superimposed signal to the splitter in the base station.

That is, the communication device 1 of the embodiment can connect subscriber telephones in public switched telephone networks (PSTN) by using the line control unit 3. In addition, the communication device 1 can connect the Internet, such as a WAN, via the communication module 5 and the ADSL modem 9. The communication device 1 also serves as a router that routes data (IP packet) to be transmitted and received between a communication device (e.g. a WWW server) on the Internet and the LAN terminals 13 to 17 on the LAN, in accordance with control executed by a router control unit 101 of the communication module 5.

The communication device 1 of the embodiment has a print function and a copy function as well as a common facsimile function of optically reading an image from a document, converting image data representing the image into facsimile data, sending the facsimile data via the analog line L1, receiving facsimile data transmitted through the analog line L1, and forming an image on a recording sheet according to the received facsimile data.

The print function refers to a function of forming an image onto a recording sheet according to code data transmitted from the PC 13 or 14 or a word processor. Upon receipt of code data from an external PC via a PC interface (I/F) 24 or from the PC 13 or 14 on the LAN via the communication module 5, the communication device 1 forms an image onto a recording sheet according to the data. The copy function refers to a function of making a copy of an image on a recording sheet according to image data read from a document by a scanning unit 35 and a recording unit 37.

Next, an electronic configuration of the communication device 1 will be described. As shown in FIG. 2, the communication device 1 includes a CPU 39, a ROM 81, a RAM 83, the scanning unit 35, an encoder 85, the recording unit 37, a decoder 87, operation keys 270, an LCD (liquid crystal display) 274, a modem 89, the line control unit 3, the PC interface (I/F) 24, a mail control unit 91, and a function extension interface 93, which are connected with each other via a bus 95. The function extension interface 93 is connected with the communication module 5.

The CPU 39 is a brain of the communication device 1 and executes centralized control of the communication device 1. For example, the CPU 39 reads a control program from the ROM 81 to execute a facsimile data transmitting/receiving operation and a printing operation in accordance with the control program.

The ROM 81 stores a print function program group to permit the communication device 1 to operate as a facsimile machine. More specifically, for example, the ROM 81 stores a data receiving program for forming an image by the recording unit 37 according to facsimile data received by the line control unit 3 from an external facsimile machine, as the facsimile function program. In addition, the ROM 81 stores a print function program group to permit the communication device 1 to operate as a printer that prints data transmitted from a PC through a WAN or a LAN. More specifically, for example, the ROM 81 stores a PC print program for forming an image by the recording unit 37 according to data, which is received by the communication module 5 from the PC 13 or 14 on the LAN or a PC on a WAN, by analyzing a command coming in from the outside. Further, the ROM 81 stores a recording unit control program to be called up in the PC print program, other various programs and various data required during execution of the various programs. The RAM 83 serves as a work memory to be used when various controls are executed, a data storage area for storing data, such as facsimile data, to be transmitted or received, and a table storage area for storing a table of IP addresses assigned to the PCs 13, 14 on the LAN.

The scanning unit 35 scans and reads a document in order to transmit facsimile data or make a copy of the document. The encoder 85 performs an encoding operation to convert image data read by the scanning unit 35 into encoded image data in G3 format (facsimile format) and then outputs the image data. The decoder 87 decodes the image data in the facsimile format to convert the data into image data processible in the recording unit 37. The recording unit 37 functions as a so-called color laser-beam printer that can form an image in color onto a recording unit, as described above. The recording unit 37 prints a color image onto a recording sheet according to image data decoded by the decoder 37 and outputs the recording sheet having the image thereon after the printing operation is completed, in accordance with instructions provided from the CPU 39 that runs the recording unit control program.

The operation keys 270 are provided at an upper portion of an operating panel 27. The operation keys 270 input a command signal into the CPU 39 to perform various operations, in accordance with instructions given by a user of the communication device 1. The LCD 274, as a display unit, is also provided at the operating panel 27 and displays various messages to show operating procedures and to inform errors to the user. The LCD 274 also functions as a touch-sensitive panel in order to display one-touch keys thereon when input from the user is required and in order to input instructions given by the user into the CPU 39.

The modem 89 is provided so that the line control unit 3 can transmit and receive facsimile data to and from an external facsimile machine connected to a public network, via the splitter 8. The line control unit 3 sends a dial signal to the public network and answers a ringing signal from the public network. For example, the line control unit 3 allows the communication device 1 to be communicable with the external facsimile machine.

The PC interface 24 is used to connect a PC and the communication device 1 via a parallel cable so that the communication device 1 can receive code data from the PC. The mail control unit 91 realizes transmitting and receiving of facsimile data using electronic mail by transmitting and receiving electronic mail to and from an external communication device connected to the Internet. A handset (H/S) 26 is connected with the modem 89 via the line control unit 3. The function extension interface 93 is a serial interface, such as AIO (analog input and output) or RS232C, that can detachably connected with the communication module 5, which includes the separate-type router control unit 101.

The communication module 5 includes the router control unit 101, the hub 103, an IP telephone unit 105, a wireless communication unit 107, a Web printing unit 110, and an interface connection terminal 109 which connects with the router control unit 101. The communication module 5 is connected with the function extension interface 93 via the interface connection terminal 109.

The router control unit 101, which functions as a broadband router having a well-known IP Masquerade (Network Address Port Translation) function and a routing function, transmits and receives IP packets, via the ADSL modem 9, to and from a communication device on the Internet. That is, the router control unit 101 mutually translates a private IP (Internet Protocol) address used in the LAN and a global IP address used in the WAN (the Internet in this embodiment) by the IP Masquerade function, and bidirectionally communicably connects the PCs 13, 14 on the LAN with a communication device on the WAN (WWW server) by the routing function.

For example, the router control unit 101 bidirectionally communicably connects the IP telephone unit 105, the wireless communication unit 107, and the Web printing unit 110 with the Internet, via the ADSL modem 9, by transmitting and receiving data to and from the IP telephone unit 105, the wireless communication unit 107, the Web printing unit 110 via the hub 103.

Further, the router control unit 101 bidirectionally communicably connects the LAN terminals 13 to 17 with the Internet by performing communication with the LAN terminals 13 to 17 on the LAN connected with the LAN port 7 via the hub 103. That is, for example, the router control unit 101 provides routing and then transmits data, which is received from the WWW server on the Internet, to the addressed LAN terminals 13 to 17.

The router control unit 101 can conduct communication with the CPU 39 of the communication device 1 via the function extension interface 93. That is, the LAN terminals 13 to 17, the IP telephone unit 105, the wireless communication unit 107, and the Web printing unit 110 can bidirectionally communicate with the CPU 39 of the communication unit 1 via the router control unit 101 and the function extension interface 93. For example, upon receipt of code data for printing from the PC 13 or 14 on the LAN through the router control unit 101, the CPU 39 of the communication device 1 runs the print function program. Then, the CPU 39 calls the recording unit control program during the execution of the print function program to control the recording unit 37 to form an image based on the data.

The IP telephone unit 105, which is connected with the router control unit 101 via the hub 103, contains a voice signal into an IP packet and conducts voice communication (telephone conversation) with an external IP telephone through the Internet. The wireless communication unit 107 conducts wireless communication between the communication device 1 and an external communication device. By using a wireless connection technology, such as the Bluetooth Standard (a standard for short-range wireless communication) or the IrDA Standard (a standard for infrared wireless communication), the external wireless communication device can be bidirectionally communicably connected with each unit of the communication device 1. That is, in the communication device 1, the LAN terminals 13 to 17 can be connected with the communication device 1 by using a cable via the LAN port 7 connected to the hub 103. By using the wireless communication unit 107, the LAN terminals 13 to 17 can be connected with the communication device 1 without cables or wires.

The Web printing unit 110 includes a CPU 111, a ROM 113, a RAM 115 and a network interface 117. The Web printing unit 110 connects itself with the Internet and communicates with the CPU 39 of the communication device 1 by performing communication with the router control unit 101 via the network interface 117.

The ROM 113 of the Web printing unit 110 stores a Web print function program group for performing operations for capturing data from the WWW server and for printing data downloaded from the WWW server by the recording unit 37 of the communication device 1. The ROM 113 also stores flag information representing operating conditions of the communication device 1 when the Web print function is being executed.

More particularly, the Web print unit 110 has a print function, a data memory function, a data transfer function, a log memory function, and an error display function. The print function is to allow the recording unit 37 to print an image based on data downloaded from the WWW server through the router control unit 101. The data memory function is to temporarily store data in the RAM 115. The data transfer function includes two types of the data transfer function: one of which is to transfer downloaded data, via the LAN port 7, to the printer 16 of the transfer target connected to the LAN, and another of which is to transfer downloaded data, via the LAN port 7, to the PC 13 or 14 connected with the LAN. The log memory function is to store log information of each processing performed by the Web printing unit 110. The error display function is to display error messages on the LCD 274. These functions are implemented by the Web printing function program group and each function is implemented based on flag information (that is, on/off of the function).

Basically, users of the LAN terminals 13 to 17 can access the communication device 1 without restraint. On the other hand, for outside users, who use WAN terminals, the access to the communication device 1 is restricted to persons who have the authority. That is, there are three types of people as outside users: people who have a password and a user ID to use the communication device 1, people who are allowed to use the communication device 1 in certain conditions although they do not have a password, and people who do not have any authority to access the communication device 1 under any circumstances. In this embodiment, as described above, the communication device 1 is protected from unauthorized outside users through the WAN.

Figure 3:
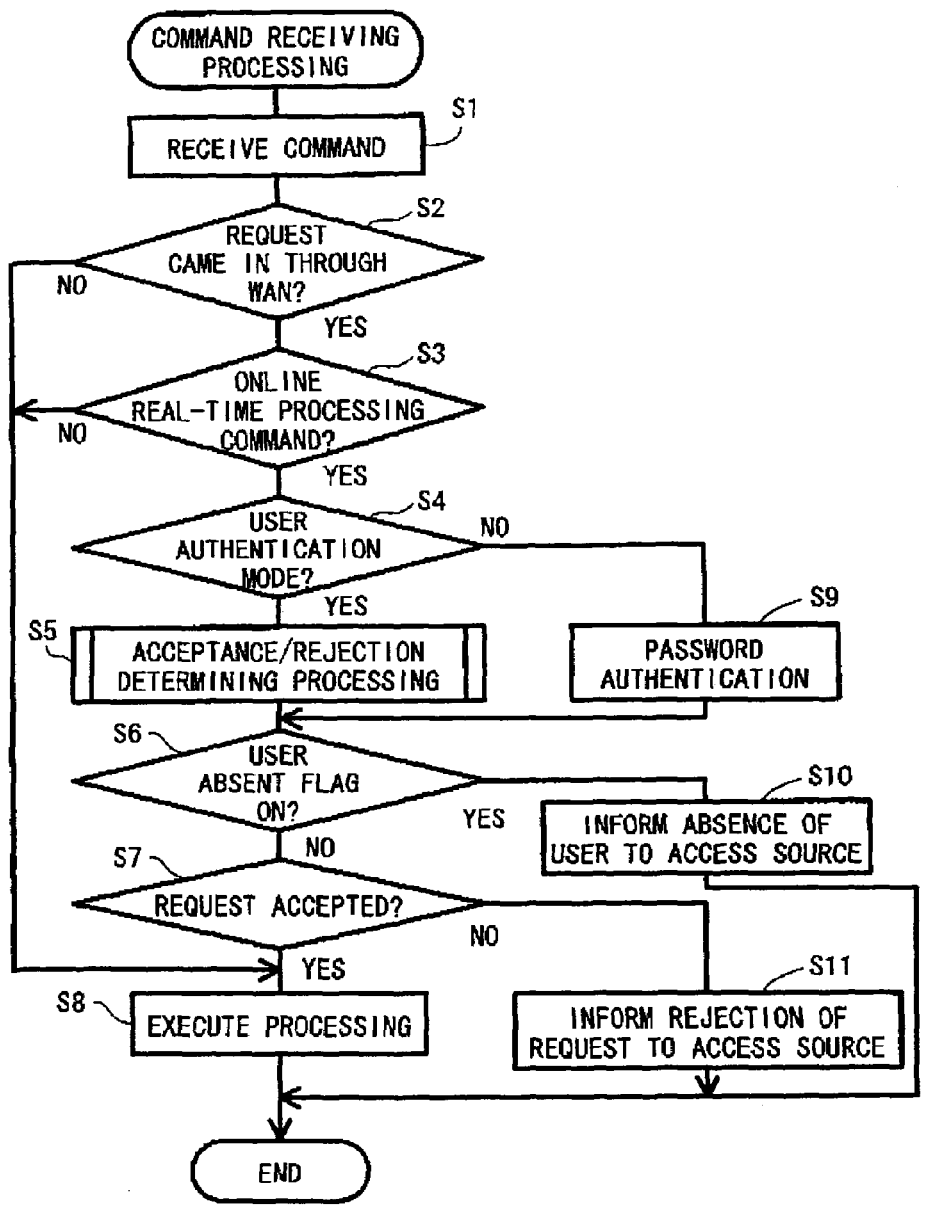
FIG. 3 is a flowchart outlining command receiving processing executed by the communication device.

Next, an operation of the communication device 1 will be described. FIG. 3 is a flowchart of an example of the command receiving processing performed by the communication device 1. Upon receipt of a command (step 1, hereinafter, S stands for step) (at this point, it is unknown whether the command was come in through the LAN or the WAN), the CPU 111 of the communication module 5 determines whether the command came in through the WAN (S2). This determination is performed based on, for example, an IP address of a transmitter that has sent the command. The communication module 5 is also assigned an IP address, so that the LAN terminals 13 to 17 and WAN terminals can access the communication device 1 by using the IP address of the communication module 5.

When the command comes in through the WAN (S2:YES), the CPU 111 then determines whether the command is a request to perform processing as a predetermined online real-time processing (S3). The command for online real-time processing will be described in detail later. For example, when the command is a real-time print command, the CPU 111 makes an affirmative judgment (S3:YES), and when the command is a storage print command, the CPU 11 makes a negative judgment (S3:NO).

When the received command is a command for performing online real-time processing, such as the real-time print command (S3:YES), the CPU 111 determines whether a current operation mode is set to a user authentication mode or an automatic authentication mode (S4). The user authentication mode is a mode in which a user identifies an access source without performing a password authentication and determines whether the access is acceptable, every time an access is made from a WAN terminal. The automatic authentication mode is a mode in which a password authentication is automatically performed by the communication device 1 and an access from a WAN terminal is accepted only when the inputted password is authenticated.

Figure 4:
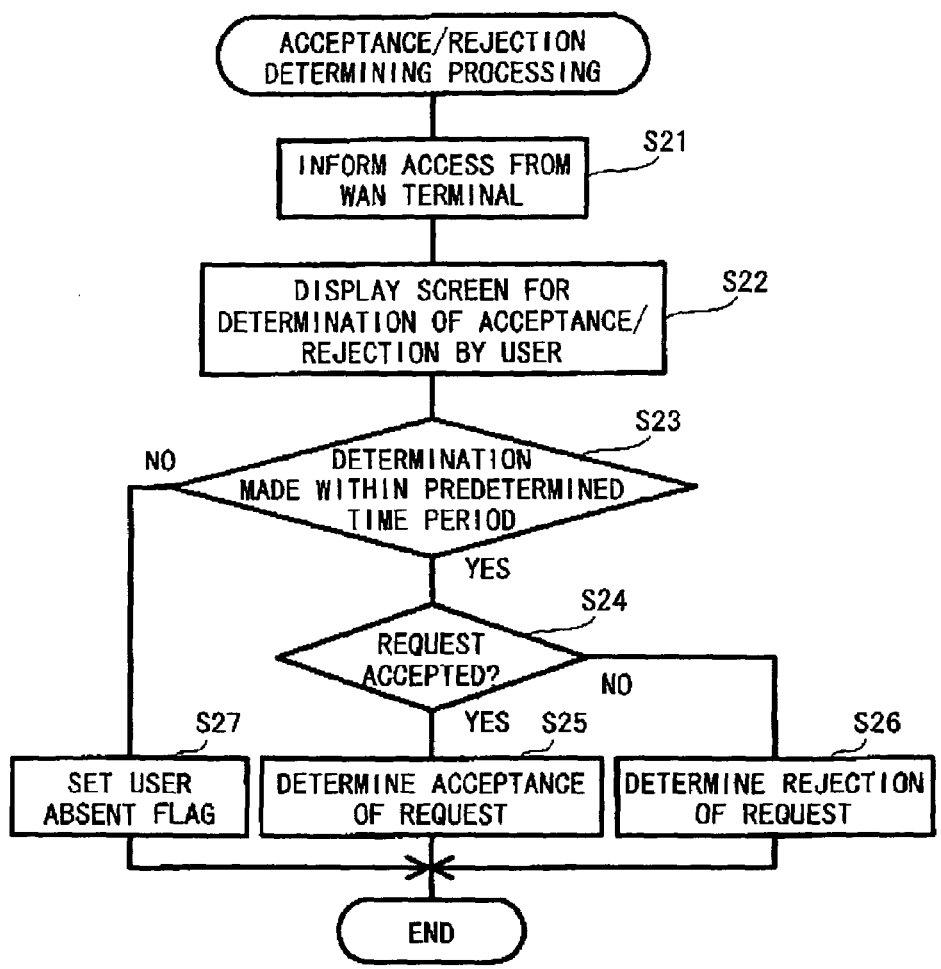
FIG. 4 is a flowchart outlining acceptance/rejection determining processing performed in the command receiving processing.
Figure 5:
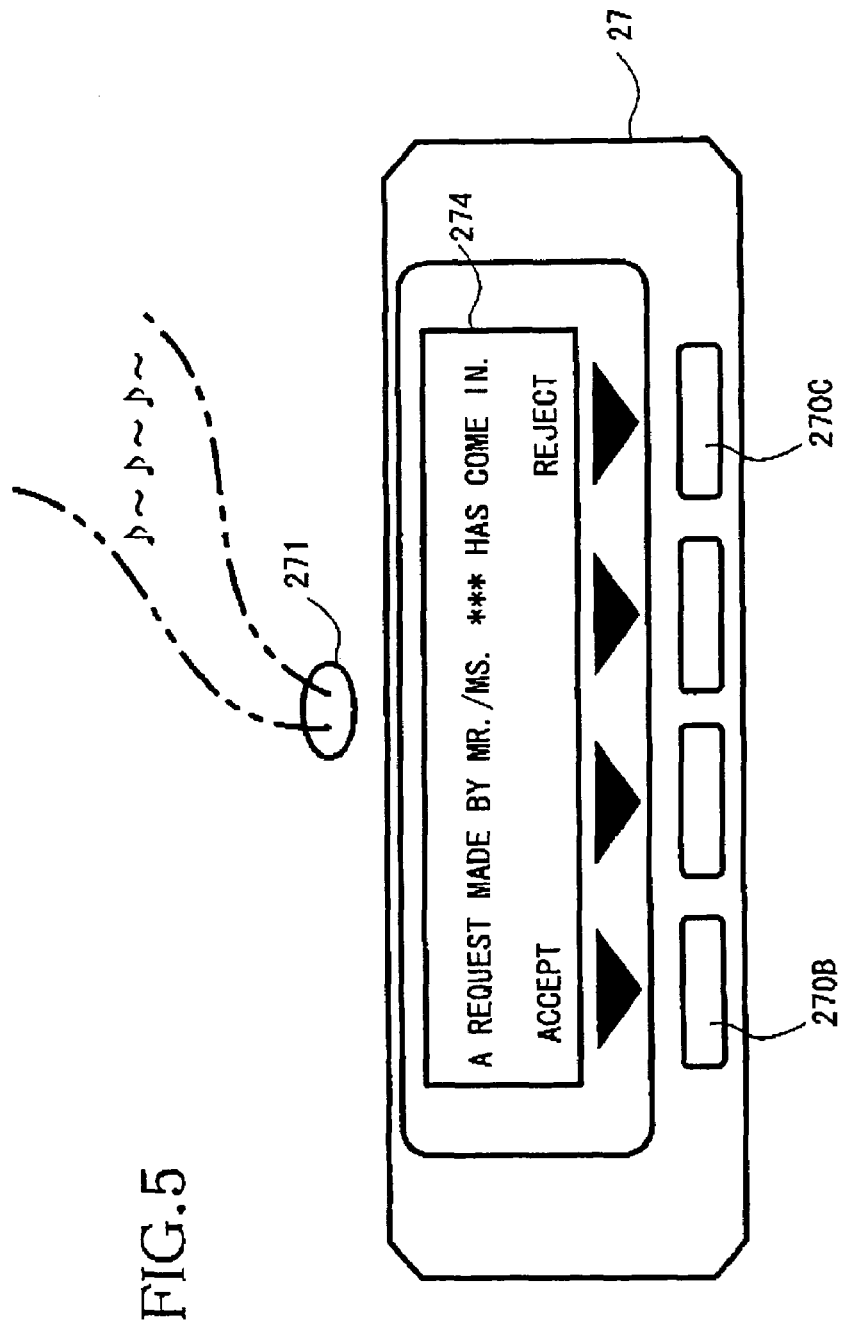
FIG. 5 is an explanatory diagram showing an operating condition of the communication device during the acceptance/rejection determining processing.

When the current operation mode is a user authentication mode (S4:YES), an acceptance/rejection determining processing shown in FIG. 4 is performed (S5). As shown in FIG. 4, at the acceptance/rejection determining processing, the user is informed that the access has been being made from the WAN terminal (S21). At that time, as shown in FIG. 5, sounds come out of a speaker 271 to indicate that an access has been made from the WAN terminal at the present time.

In addition, a screen that allows a user to determine whether the request is acceptable is displayed on the LCD 274 (S22). For example, as shown in FIG. 5, a message such that "A request made by Mr./Ms. * has come in." is displayed on the LCD 274. Words "accept" and "reject" are also displayed on the LCD 274 so as to indicate which operation keys 270B, 270C function as an acceptance key and a rejection key. "*"

is specified based on a user registration table, which is created in advance to provide a relationship between users of WAN terminals and IP addresses of the WAN terminals. When an IP address of an WAN terminal accessing to the communication device 1 is not registered in the user registration table in advance, the IP address is displayed on the LCD 274, just as it is. A type of a print request is displayed on the LCD 274 with the messages or IP address, corresponding to the requested command, such as a real-time print command or a storage print command.

When the determination of acceptance/rejection is made by the user within a predetermined period of time (S23:YES) and "acceptance" is selected by the user by pressing the acceptance key 270B (S24:YES), the acceptance of the request is determined (S25). Then, this determination result is sent back to the main routine (the command receiving processing) of FIG. 3. For example, when the command is a print request, the acceptance of printing is determined.

At S24, when "rejection" is selected by the user by pressing the rejection key 270C (S24:NO), the rejection of the request is determined (S26). Then, this determination result is sent back to the main routine (the command receiving processing) of FIG. 3. At S23, when the determination is not made by the user within the predetermined period of time (S23:NO), a user absent flag is set (S27) and then this information is sent back to the main routine (the command receiving processing) of FIG. 3.

Referring to FIG. 3, when a user absent flag is not set (S6:NO) and the CPU 111 receives the acceptance of the request (S7:YES), the CPU 111 performs processing in accordance with the data received with the command (S8). For example, when the command is a print request, the CPU 111 allows the recording unit 37 to perform a printing operation based on received print data. As described above, the execution of the printing operation is determined in accordance with the determination by the user (the acceptance/rejection of the request), even when the print data is transmitted from a WAN terminal, without performing the password authentication.

When receiving the rejection of the request (S7:NO), the CPU 111 informs the WAN terminal user, which has accessed, through the WAN, that the request has been rejected (S11). For example, when the command is a print request, the printing operation requested by the WAN terminal is not performed in the communication device 1 and the user of the WAN terminal is informed that the printing operation cannot be performed. An acceptance of the request or a completion of processing may be also informed to the user of the WAN terminal (access source), when processing is performed by the acceptance of the request.

At S6, when the user absent flag is on (S6:YES), the CPU 111 informs the WAN terminal, which has accessed, of the absence of the user, through the WAN (S10). For example, when the command is a print request, the printing operation requested by the WAN terminal is not performed in the communication device 1 and the user of the WAN terminal is informed that the printing operation cannot be performed because the user of the communication device 1 who has the authority to perform authentication was not present near the communication device 1.

At S4, when the current operation mode is an automatic authentication mode (S4:NO), the password authentication is automatically performed by the communication device 1 (S9). At the password authentication, a password and a user ID transmitted from a WAN terminal together with the command are confirmed whether the password and the user ID match those registered in the communication device in advance. When the transmitted password and user ID match the registered ones, an affirmative judgment is made at S7 (S7:YES). When the transmitted password and user ID do not match the registered ones, a negative judgment is made at S7 (S7:NO) and then the CPU 111 informs the WAN terminal that the request cannot be performed in the communication device (S11).

At S3, when it is determined that the command is the storage print command (S3:NO), that is, the command is not an online real-time processing command, the CPU 111 temporarily stores print data received together with the command, into the RAM 115. Then, the printing operation is performed by the recording unit 37 by confirming the stored print data by the user, printing and erasing the print data.

At S2, when it is determined that the command came in through the LAN (S2:NO), flow moves to S8 and the CPU 111 immediately performs processing corresponding to the command. For example, when the command is a print request, the CPU 111 allows the recording unit 37 to perform the printing operation.

According to the communication device 1 of the above-described embodiment, the user of the communication device 1 must determine whether a request from a WAN terminal is accepted or rejected every time the request comes in through a WAN. Accordingly, unauthorized access to the communication device 1 from an external Internet can be prevented. When a request is made by any of the LAN terminals 13 to 17, processing is immediately performed without performing the determination/selection by the user. Thus, the usability of the communication device 1 can be improved.

Next, another embodiment of the invention will be described. The structure of a communication device and command receiving processing according to this embodiment are the same as the structure of the communication device 1 shown in FIGS. 1 and 2 and the command receiving processing of FIG. 3, respectively. Therefore, only different parts will be described below.

Figure 6:
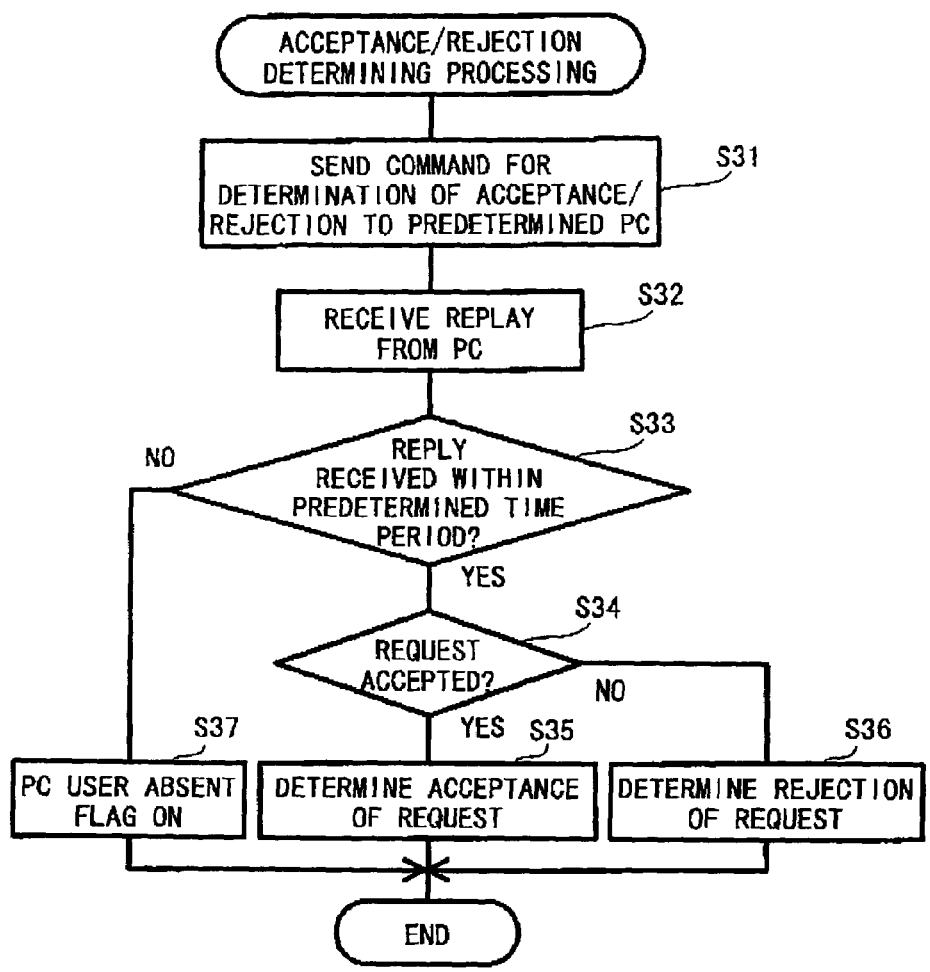
FIG. 6 is a flowchart outlining acceptance/rejection determining processing performed in a command receiving processing according to another embodiment.

FIG. 6 shows a flowchart of acceptance/rejection determining processing included in the command receiving processing according to another embodiment. As shown in FIG. 6, at the acceptance/rejection determining processing of this embodiment, first, a command to allow a user of a predetermined PC 13 to determine acceptance or rejection of the request through the LAN port 7 and the LAN (S31).

Figure 7:
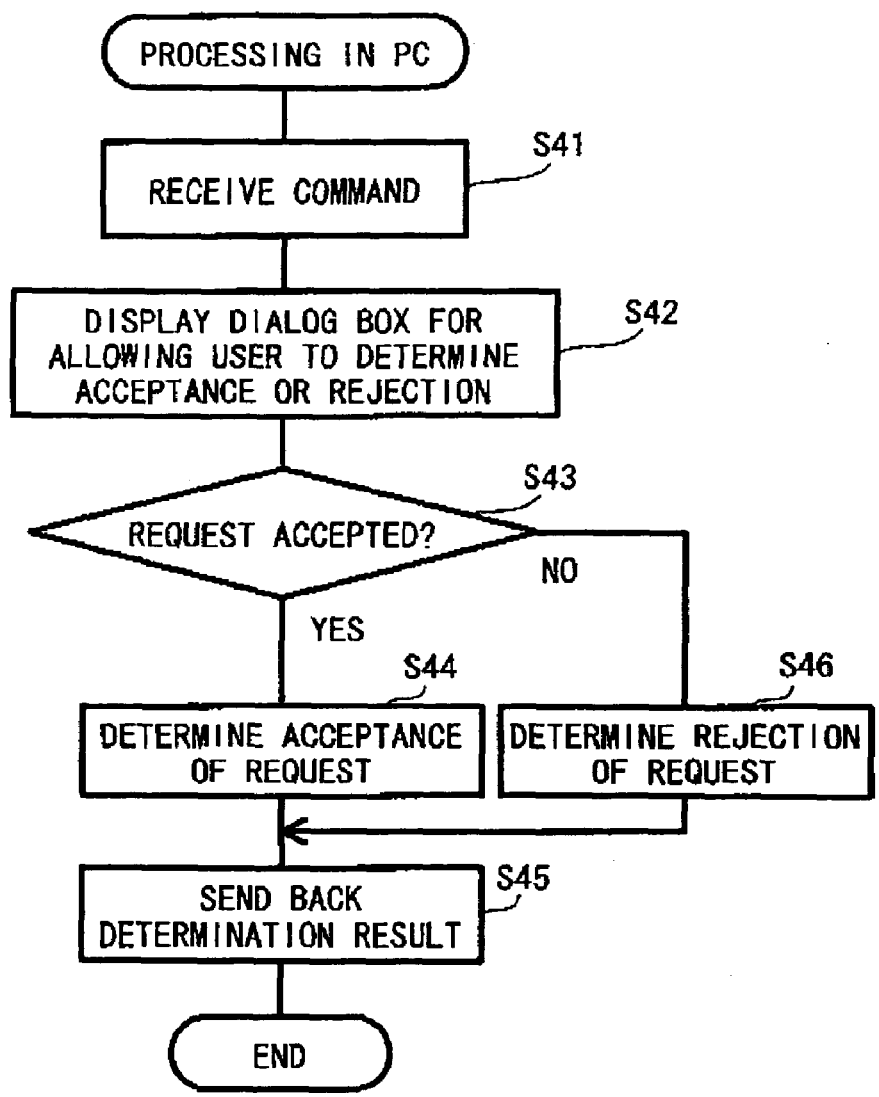
FIG. 7 is a flowchart outlining processing to be executed by a PC in accordance with the acceptance/rejection determining processing of FIG. 6.

FIG. 7 shows a flowchart of processing to be executed by a PC 13 in accordance with the acceptance/rejection determining processing (S31). As shown in FIG. 7, upon receipt of the command (S41), the PC 13 displays a dialog box for allowing the user to determine "acceptance" or "rejection", on its display (S42). For example, as shown in FIG. 8, a message (a dialog box 20A) such that "A request made by Mr./Ms. * has come in." is displayed on the display of the PC 13. In addition, operation buttons 20B and 20C, which indicate "Yes" and "No", respectively, are displayed so as to be clicked by using a mouse. At that time, as shown in FIG. 8, sounds come out of a speaker (not shown) to inform the user of the communication device 1** that an access is being made from a WAN terminal.

After that, when the user of the PC 13 accepts the access by clicking the "yes" button 20B (S43:YES), the acceptance of the request is determined (S44) and then the determination result is sent back to the communication device 1 via the LAN (S45). When the user of the PC 13 rejects the request by clicking the "no" button 20C (S43:NO), the rejection of the request is determined (S46) and then this determination result is sent back to the communication device 1.

As shown in FIG. 6, upon receipt of the determination result from the PC 13 (S32), the CPU 111 determines whether the reply was received within a predetermined period of time (S33). When the CPU 111 receives the reply from the PC 13 within a predetermined period of time (S33:YES), then, the CPU 111 determines whether the reply (determination result) is acceptance of the request (S34). When the reply is the acceptance of the request (S34:YES), the acceptance of the request is determined (S35) and then this determination result is sent back to the main routine (the command receiving processing) of FIG. 3.

At S33, when the CPU 111 does not receive the reply within the predetermined period of time (S33:NO), the CPU 111 sets a PC user absent flag on (S37). This information is sent back to the main routine (the command receiving processing) of FIG. 3. At S34, when the CPU 111 receives the rejection of the request from the PC 13 (S34:NO), the rejection of the request is determined (S36) and then this determination result is sent back to the main routine (command receiving processing) of FIG. 3.

According to the communication device 1 of this embodiment, the predetermined PC 13 is demanded, via the LAN, to determine whether a request is accepted or rejected every time a request comes in through the WAN. Accordingly, unauthorized access to the communication device 1 from an external Internet can be prevented. When a request is made by any of the LAN terminals 13 to 17, processing is immediately performed without performing the determination by the PC 13. Thus, the usability of the communication device 1 can be improved.

While the invention has been described in detail with reference to the specific embodiments thereof, it should be apparent to those skilled in the art that various changes, arrangements and modifications may be applied therein without departing from the spirit and scope of the invention.

In the above-described embodiments, the print function has been described as an example of the invention. The processing, which is the same as the above-described embodiments, may be applied to, for example, a case where access is made to the communication device 1 from a WAN terminal in order to read and store data from and into the RAM 83 or a case where access is made to the communication device 1 from a WAN terminal in order to change the setting of the communication device 1 by remote control. When the communication device 1 is designed so as to be detachably attachable with a portable memory card, the processing, which is the same as the above-described embodiments, may be applied to a case where access is made to the memory card from a WAN terminal in order to read and store data from and into the memory card. Further, the processing, which is the same as the above-described embodiments, may be applied to a case where transmission of facsimile data is started by remote control by a WAN terminal or a case where a WAN terminal reads received facsimile data by accessing the communication device 1.

In the above cases, the data transmission by the facsimile function, the reading of data from the memory card, the setting of the communication device 1 by remote control, and the viewing received facsimile data correspond to the online real-time processing, so that an affirmative judgment is made at S3 of FIG. 3 upon receipt of these commands. Voice messages and recording of data into the memory card are examples of commands other than the online real-time processing, so that a negative judgment is made at S3 of FIG. 3 upon receipt of these command.

A network printer is one of preferable examples of the communication device 1. However, the communication device 1 may be, for example, a multifunctional printer that has a facsimile function, a copy function and an e-mail transmitting and receiving function. When the WAN port 6 and the LAN port 7 are separately provided, it can be determined whether the data is transmitted from a LAN terminal or a WAN terminal, by determining signals outputted from the ports 6, 7. The WAN includes an Integrated Services Digital Network (ISDN), a Switched Multimegabit Data Service (SMDS), a frame relay, a High data rate Digital Subscriber Line (HDSL), an Asynchronous Transfer Mode (ATM) line, and a general telephone line, as well as the Internet.

According to the communication device 1 described in each embodiment above, unauthorized access from outsiders can be prevented because a user of the communication device 1 must determine whether a request is accepted every time the request is made by a WAN terminal. When a request is made by a LAN terminal, the determination is not requested to the user, so that the usability of the communication device 1 can be improved. When a request is come in through the LAN, the LAN terminal, which is an access source and has made the request, can be specified with reference to the user registration table.

As described above, the communication device 1 includes the LCD 284 and the operation keys 270. With this structure, the user who can directly operate the communication device 1 can determine and select whether the request of the WAN terminal is accepted. Because the LCD 274 and the operation keys 270 are provided to the operating panel 27, the user can directly operate the operating panel 27 as a user interface.

In the communication device 1, the CPU 111 informs an access source of a user's absence from the communication device 1 when the user does not operate the communication device 1 within the predetermined period of time. With this structure, when the user does not reply to the request made by a WAN terminal, the user's absence from the communication device 1 can be informed to the WAN terminal of the access source. When it is determined that a request is made by a WAN terminal, a user of a LAN terminal must determine whether the request is accepted or rejected. Accordingly, even when the user of the communication device 1 does not exist near the communication device 1, the determination can be made on the request of the WAN terminal via the LAN. Only when a predetermined online real-time processing is requested by a WAN terminal, the acceptance/rejection determination is demanded to the user. Therefore, the communication device 1 can immediately perform the processing requested by the WAN terminal.

Further, according to the communication device 1, the user authentication mode and the automatic authentication mode can be set. In the user authentication mode, the acceptance/rejection determination is demanded to the user without fail when a request is made by a WAN terminal. In the automatic authentication mode, for example, a password authentication is performed to permit the execution of a request by a WAN terminal. As described above, an appropriate mode can be exclusively set in accordance with usage of the communication device 1. When a request made by a WAN terminal is rejected by the user of the communication device 1 or the PC 13, this determination result can be informed to the WAN terminal. Furthermore, the communication device 1 can implement processing corresponding to a command, which is issued by a LAN terminal and a WAN terminal, wherein the command is for performing an printing operation, transmitting facsimile data, reading data from detachably attachable memory, changing the setting of the communication device 1, or reading received facsimile data.

What is claimed is:

1. A communication device, comprising:
a first input portion connected with a wide area network (WAN);
a second input portion connected with a local area network (LAN); and
a controller that:
determines whether a request to perform predetermined processing came in from the WAN or the LAN;
automatically accepts an operation according to the request every time that it is determined that the request came in from the LAN;
allows a user of the communication device to determine whether the operation according to the request is accepted or rejected every time that it is determined that the request came in from the WAN; and
allows the predetermined processing to be performed according to the request when a performance of the operation according to the request is accepted.

2. The communication device according to claim 1, wherein the controller includes an IP address table storage portion that stores IP addresses of terminals connected with the LAN, and the controller identifies a terminal which has issued the request with reference to the IP address indicating the terminal and the IP address table.

3. The communication device according to claim 1, further comprising:
a display unit that displays an inquiry about whether the performance of the operation according the request is accepted or rejected; and
an input unit through which the user can input an answer of whether the request is accepted or rejected in response to the inquiry.

4. The communication device according to claim 3, wherein the display unit and the input unit are provided at an operating portion.

5. The communication device according to claim 1, wherein the controller informs a terminal, which made the request, that the user of the communication device is not near the communication device when the determination is not made by the user within a predetermined period of time.

6. The communication device according to claim 1, wherein the controller demands a user of a LAN terminal to determine whether the performance of the operation according to the request is accepted or rejected when it is determined that the request came in from the WAN.

7. The communication device according to claim 1, wherein the controller demands the user of the communication device to determine whether the performance of the operation according to the request is accepted or rejected only when the received request involves predetermined online real-time processing, which is a specified request from the WAN.

8. The communication device according to claim 1, wherein the controller:
exclusively sets a first operation mode in which the determination of whether the performance of the operation is accepted or rejected is demanded; and
sets a second operation mode in which the controller allows the predetermined processing to be performed according to the request that comes in from the WAN when the performance of the operation is accepted aside from the first operation mode.

9. The communication device according to claim 1, wherein the controller informs a WAN terminal, that made the request, of a result of the determination by the user of the communication device as to the performance of the operation.

10. The communication device according to claim 1, wherein the request received from the LAN or the WAN is at least one of: performance of a printing operation, transmission of facsimile data, reading of data from detachably attachable memory, setting change of device, and reading of received facsimile data, and the controller performs processing in accordance with the received request.

11. A method of communicating with a communication device, comprising:
a first input portion connected with a wide area network (WAN);
a second input portion connected with a local area network (LAN), comprising:
determining whether a request to perform predetermined processing came in from the WAN or the LAN;
automatically accepting an operation according to the request every time that it is determined that the request came in from the LAN;
allowing a user of the communication device to determine whether the operation according to the request is accepted or rejected every time that it is determined that the request came in from the WAN; and
allowing the predetermined processing to be performed according to the request when a performance of the operation according to the request is accepted.

12. The method of claim 11, further comprising:
identifying a terminal which has issued the request with reference to an IP address indicating the terminal and an IP address table.

13. The method of claim 11, further comprising:
displaying an inquiry about whether the performance of the operation according the request is accepted or rejected; and
inputting a user answer of whether the request is accepted or rejected in response to the inquiry.

14. The method of claim 11, further comprising:
informing a terminal, which made the request, that the user of the communication device is not near the communication device when the determination is not made by the user within a predetermined period of time.

15. The method of claim 11, wherein a user of a LAN terminal must determine whether the performance of the operation according to the request is accepted or rejected when it is determined that the request came in from the WAN.

16. The method of claim 11, wherein the user of the communication device must determine whether the performance of the operation according to the request is accepted or rejected only when the received request involves predetermined online real-time processing, which is a specified request from the WAN.

17. The method of claim 11, further comprising:
setting, exclusively, a first operation mode in which the determination of whether the performance of the operation is accepted or rejected is demanded; and
setting a second operation mode in which the controller allows the predetermined processing to be performed according to the request that comes in from the WAN when the performance of the operation is accepted aside from the first operation mode.

18. The method of claim 11, further comprising:
informing a WAN terminal, that made the request, of a result of the determination by the user of the communication device as to the performance of the operation.

19. The method of claim 11, wherein the request received from the LAN or the WAN is at least one of: performance of a printing operation, transmission of facsimile data, reading of data from detachably attachable memory, setting change of device, and reading of received facsimile data, and processing is performed in accordance with the received request.

20. A communication device, comprising:
    a first input portion connected with a wide area network (WAN);
    a second input portion connected with a local area network (LAN); and
    a controller that:
        automatically performs predetermined processing according to a request every time that a performance of an operation is requested by a LAN;
        allows a user of the communication device to determine whether an operation according to the request is accepted or rejected every time that it is determined that the request came in from the WAN; and
        performs predetermined processing according to a request from the WAN when a performance of the operation according to the request is accepted.

* * * * *